US009132730B2

(12) United States Patent
Hoeck et al.

(10) Patent No.: US 9,132,730 B2
(45) Date of Patent: Sep. 15, 2015

(54) METHOD FOR THE DISTRIBUTION OF DRIVE TORQUE

(75) Inventors: Michael Hoeck, Neunkirchen-Seelscheid (DE); Harwin Niessen, Huerth (DE)

(73) Assignee: GETRAG Driveline Systems GmbH (DE)

( * ) Notice: Subject to any disclaimer, the term of this patent is extended or adjusted under 35 U.S.C. 154(b) by 1810 days.

(21) Appl. No.: 11/753,141

(22) Filed: May 24, 2007

(65) Prior Publication Data

US 2007/0282512 A1 Dec. 6, 2007

(30) Foreign Application Priority Data

May 30, 2006 (DE) .................... 10 2006 026 188

(51) Int. Cl.
*G06F 17/00* (2006.01)
*B60K 23/04* (2006.01)
*F16H 48/22* (2006.01)
*F16H 48/20* (2012.01)

(52) U.S. Cl.
CPC ............ *B60K 23/04* (2013.01); *B60W 2520/26* (2013.01); *B60W 2520/266* (2013.01); *F16H 48/22* (2013.01); *F16H 2048/204* (2013.01); *F16H 2048/205* (2013.01)

(58) Field of Classification Search
CPC .. B60K 23/04; B60K 23/043; B60K 17/3462; B60K 17/3465; B60W 2520/26; B60W 2520/263; B60W 2520/266; B60W 10/12
USPC ......................................... 701/69, 70, 71, 82
See application file for complete search history.

(56) References Cited

U.S. PATENT DOCUMENTS

| | | | | |
|---|---|---|---|---|
| 4,718,685 A | * | 1/1988 | Kawabe et al. ............... | 180/415 |
| 4,721,176 A | * | 1/1988 | Kabasin et al. ............... | 180/197 |
| 4,790,404 A | * | 12/1988 | Naito ............................. | 180/197 |
| 5,099,944 A | * | 3/1992 | Kageyama et al. ........... | 180/249 |
| 5,490,070 A | * | 2/1996 | Kiryu et al. ..................... | 701/70 |
| 5,574,643 A | * | 11/1996 | Yesel .............................. | 701/88 |
| 5,839,084 A | * | 11/1998 | Takasaki et al. ............... | 701/67 |
| 6,120,407 A | | 9/2000 | Mimura | |

FOREIGN PATENT DOCUMENTS

| | | |
|---|---|---|
| DE | 196 37 193 A1 | 3/1997 |
| DE | 196 01 795 A1 | 7/1997 |

(Continued)

OTHER PUBLICATIONS

Robert Bosch GmbH, BOSCH Automotive Handbook, 6$^{th}$ Edition; p. ND1, p. 753; Published Oct. 2004, Germany, corresponds to Bosch Kraftfahrtechnisches Taschenbuch discussed on p. 1 of the specification.

*Primary Examiner* — Mussa A Shaawat
*Assistant Examiner* — Kyung Kim
(74) *Attorney, Agent, or Firm* — Knobbe Martens Olson & Bear, LLP

(57) ABSTRACT

A method for the distribution of drive torque to the wheels of a driven axle of a motor vehicle. The bend slip between a bend-inside and a bend-outside wheel of an axle of the motor vehicle during cornering is calculated. The inner drive slip between the bend-inside driven wheel and the bend-inside nondriven wheel is calculated. The drive torque is distributed as a function of a difference between the inner drive slip and the bend slip, multiplied by a scaling factor.

20 Claims, 5 Drawing Sheets

(56) References Cited

FOREIGN PATENT DOCUMENTS

| | | |
|---|---|---|
| DE | 198 13 736 A1 | 10/1998 |
| DE | 197 33 674 A1 | 2/1999 |
| DE | 199 54 131 A1 | 5/2001 |
| DE | 102 36 734 A1 | 2/2004 |
| DE | 10 2005 018 069 A1 | 11/2005 |
| DE | 10 2004 046 008 A1 | 3/2006 |

* cited by examiner

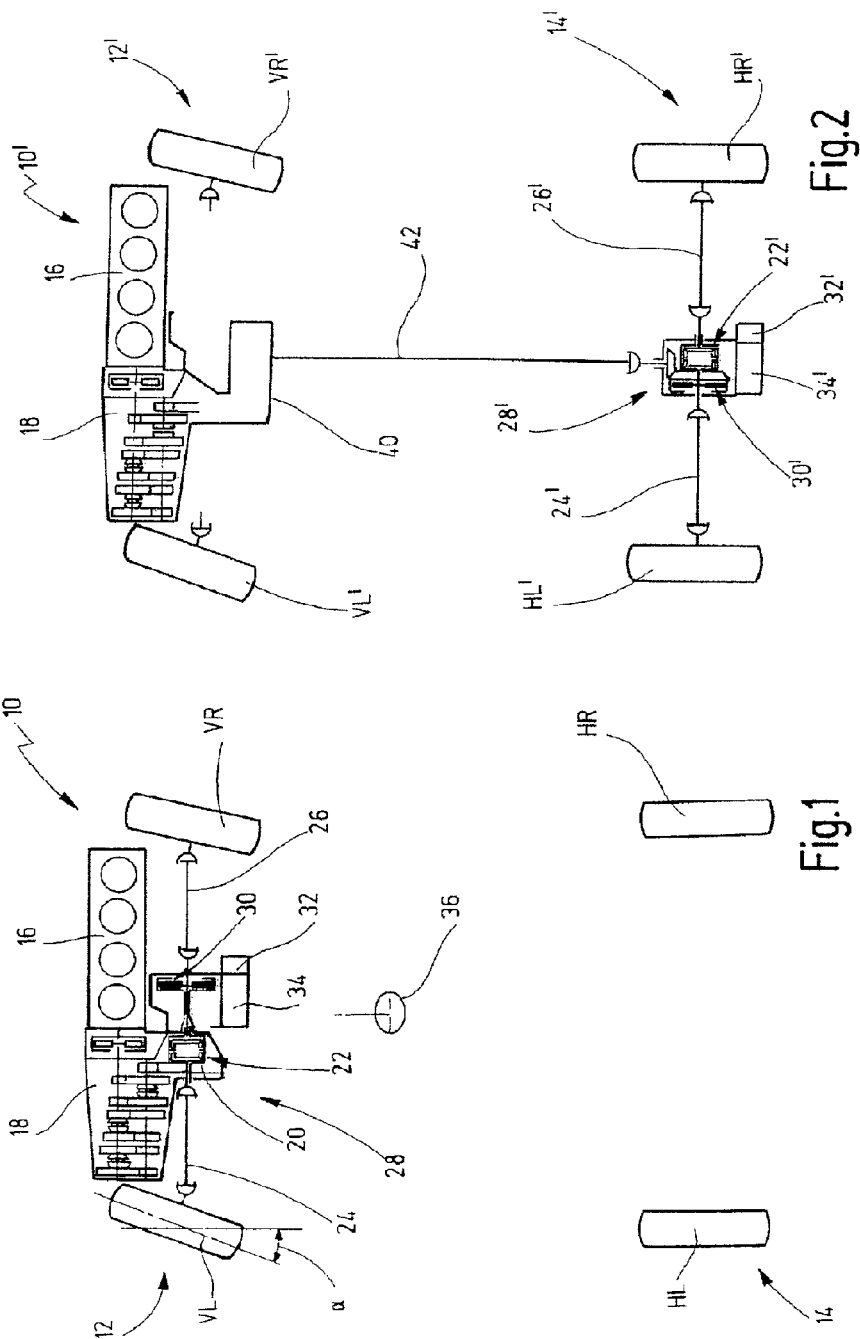

METHOD FOR THE DISTRIBUTION OF DRIVE TORQUE

CROSS-REFERENCE TO RELATED APPLICATIONS

This application claims the benefit of the priority of German patent application 10 2006 026 188, filed May 30, 2006.

BACKGROUND OF THE INVENTION

The present invention relates to a method for the distribution of drive torque to the wheels of a driven axle of a motor vehicle.

A differential or balancing gear serves for compensating different rotational movements of wheels of a motor vehicle. Such a differential is therefore provided on each driven axle of a motor vehicle, in order, particularly during cornering, to compensate different rotational speeds of the bend-inside (corner-inside) and of the bend-outside (corner-outside) wheel. Differentials which are assigned to a driven axle are conventionally designed as what are known as open differentials. They have the function of a torque balance and generally provide a torque equilibrium between the left and the right driving wheel. If there are road conditions with different coefficients of friction on the driving wheels ("μ-split"), then the transmittable propulsion force of the vehicle is limited on account of the balance effect to the double value of the propulsion force of the wheel with the lower coefficient of friction. If there is an excessive drive torque, this wheel then spins.

Furthermore, it is known (Bosch—Kraftfahrtechlisches Taschenbuch [Motor Vehicle Manual], 24th edition, Vieweg Verlag, page 668) to avoid or to reduce the abovementioned undesirable effect by the positive or nonpositive locking of the differential. Positive locks are switched on by the driver. In light of the distortion of (tension in) the drive train which in this case occurs, positive locks, as a rule, are switched on only in the case of all-wheel vehicles driving off-road.

Of the known nonpositive locking differentials there are those with a fixed degree of locking, torque-sensing locking differentials (for example, Torsen differential), and locking differentials sensing rotational speed (for example, Visco clutches). These differentials are all passive locking differentials.

Electronically controlled locking differentials (what are known as active locking differentials), in which the degree of locking is controlled by a drive dynamics controller in the vehicle, are also known.

Passive locking differentials can influence the driving behavior during cornering positively, but also negatively. In principle, in cornering free of any transverse force, a locking differential generates an understeer torque on account of its locking function. This understeer torque is based on the distortion (generated by the locking function) between the more slowly running bend-inside wheel and the faster running bend-outside wheel and on the coupling of the two wheels via the road. The distortion torque acts positively on the bend-inside wheel and negatively on the bend-outside wheel and consequently generates the understeer torque. In cornering with low transverse accelerations, this behavior is considered to be negative.

When the vehicle negotiates a bend (i.e. drives a corner) with higher transverse acceleration, the bend-inside wheel is relieved and the bend-outside wheel is loaded. With the bend-inside wheel being increasingly relieved, the distortion torque can no longer be fully supported, since the adhesion potential of the bend-inside wheel is reduced. Similarly to this, the drive force on the bend-outside wheel rises. This force then generates a yawing moment which supports turning the vehicle into the bend. Understeering is reduced, and, as compared with a vehicle with an open differential, a higher transverse acceleration can be achieved, since the adhesion potential of the bend-outside wheel can be utilized more effectively.

In electronically controlled differentials, it has been known hitherto to increase the degree of locking essentially as a function of traction. Active locking differentials of this type are therefore used predominantly in off-road vehicles. However, electronic locking differentials are also used in order to improve handling in sports vehicles (for example, F430).

The document DE 197 33 674 A1 discloses a method for increasing the driving stability of a motor vehicle, the engine drive torque being increased on a bend and at the same one of the driven wheels being braked in order thereby to regulate to a desired yawing moment.

It is known from DE 199 54 131 A1 to calculate a virtual bend radius from wheel rotational speeds, to calculate a desired radius from the steer angle and, as a function of these, to activate an assigned brake or differential lock of a differential gear.

Furthermore, it is known from the document DE 196 37 193 A1 to provide a special differential which sets up different ratios between the driven wheels.

DE 10 2005 018 069 A1 discloses a control for active wheel steering, and from the document DE 196 01 795 it is known to increase the yawing moment by braking the bend-inside rear wheel.

Furthermore, DE 102 36 734 A1 shows a steering actuator, by means of which, in addition to or instead of the setting of a steer angle, a longitudinal force can be applied to at last one vehicle wheel in order to follow a desired bend path.

Finally, the laid-open publication DE 198 13 736 A1 discloses a control system for regulating the driving stability, specifically by the selective braking of individual wheels, wherein understeering is to be prevented.

The document DE 10 2004 046 008 A1 discloses a drive train in which the drive torque is distributed to the driven wheels of an axle by means of what is known as a twin clutch. The twin clutch has two individual clutches, the input members of which are connected to one another and receive drive torque. The output members are in each case connected to one of the driven wheels. Such a twin clutch allows directed torque distribution and, moreover, replaces a conventional transverse differential.

Furthermore, the document U.S. Pat. No. 6,120,407 discloses a driven axle which has a conventional open transverse differential. Furthermore, each drive shaft is assigned a planet wheel set arrangement and an activatable clutch. The wheel set arrangements in each case act between the differential cage and the drive shaft and make it possible, as required (for example, in cornering), to set up a rotational speed difference between the wheels.

SUMMARY OF THE INVENTION

An object of the invention, in general, is to specify an improved method for the distribution of drive torque to the wheels of a driven axle of a motor vehicle.

An object of the invention, in particular, is to specify a method for the activation of a variable, as a rule an electronically controlled locking differential, by means of which an understeer effect in the case of low transverse accelerations can be reduced.

This object is achieved, in general form, by means of a method for the distribution of drive torque to the wheels of a driven axle of a motor vehicle, having the steps:

calculating the bend slip between a bend-inside and a bend-outside wheel of an axle of the motor vehicle, calculating the inner drive slip between the bend-inside driven wheel and the bend-inside nondriven wheel, and distributing the drive torque as a function of a difference between the inner drive slip and the bend slip, multiplied by a scaling factor.

By virtue of the method according to the invention, it becomes possible to distribute the drive torque to the wheels of the driven axle not only as a function of a rotational speed difference between these wheels. On the contrary, the calculation of the distribution of the drive torque also incorporates the rotational speed of at least one wheel of a further, in particular nondriven axle. As a result, the evaluation of the slip situation on the driven axle can, as it were, be placed on a "more neutral basis".

It is particularly preferred if more drive torque is allocated to the bend-outside driven wheel when the inner drive slip is higher than or equal to the bend slip, multiplied by a scaling factor.

If the bend-inside driven wheel begins to slip as a consequence of this, more torque can be allocated to the bend-outside wheel by means of the method according to the invention.

As a result, in particular, an understeering tendency can be reduced.

The scaling factor by means of which the bend slip is scaled is in the simplest instance 1. In this case, a distribution of the drive torque to the bend-outside driven wheel takes place when the inner drive slip is higher than or equal to the bend slip.

If more drive torque is to be allocated to the bend-outside driven wheel even at an early stage (in anticipation), a scaling factor of, for example, 0.8 may also be used. If, on the other hand, this reaction is to commence at a late stage, a scaling factor of 1.2 may also be used.

In general, the scaling factor according to the invention may lie in the range of about 0.2 to 1.5.

It is appreciated that, when the method according to the invention is carried out, the scaling factor may either be set permanently or be variable during travel, for example as a function of a desired driving mode (sporty, normal, comfortable, to name some examples).

According to a further preferred exemplary embodiment, the drive torque is distributed by the activation of a variable locking differential of the driven axle.

Variable locking differentials are based, as a rule, on conventional transverse differentials and are therefore available at comparatively low costs and may in a simple modular way be part of a range of different drive trains.

In this case, it is particularly advantageous if the locking differential is activated in response to a locking value of more than a predetermined basic locking value solely in the case of the locking condition that the inner drive slip is higher than or equal to the bend slip, multiplied by a scaling factor.

In general, drive torque distribution takes place such that the inner drive slip, that is to say essentially the drive slip on the wheel running on the inside of the bend, is calculated and, beyond a specific threshold, a locking torque according to the locking value is generated.

In order to avoid a premature actuation of the locking differential, in this case a variable slip threshold is ideal at which the locking differential is activated in response to a locking value of more than a predetermined basic locking value solely when the bend-inside driven wheel has a slip equal to or higher than the bend slip.

A slip threshold dependent on the bend radius can thereby be implemented. In particular, the situation can be prevented where the locking differential is activated on very narrow bends even at low vehicle speeds, which could lead to the distortions (tensions) in the drive train which were described initially.

In general, it is preferred if the locking differential is normally regulated to a locking value of 0%. In many instances, however, locking differentials of this type also have normally a certain base locking value which in the present context is designated as the basic locking value. As stated, however, the basic locking value may in the simple instance also amount to 0%.

Overall, by virtue of the activation method according to the invention, an improved traction of the motor vehicle can be implemented, and also, in particular, an improved driving behavior in cornering and increased driving safety in the bend limit range.

It is particularly advantageous if, in the case of the locking condition, the locking differential is activated such that the locking value is the higher, the higher the inner drive slip is. In other words, with increasing slip, the locking torque generated by the locking differential is increased.

The calculation of the locking value may take place, for example, by means of a controller, in particular a P, a PI or a PID controller.

It is appreciated, in this case, that the aim of drive torque distribution is to keep the inner drive slip as low as possible. Such an inner drive slip which occurs is therefore leveled off preferably immediately (that is to say, virtually in real time). It could therefore also be stated that the degree of locking is the higher, the higher an inner drive slip would be without the locking action of the differential.

According to a further preferred embodiment, the basic locking value is a minimum locking value of the locking differential.

As already explained above, many locking differentials possess a certain basic locking value as the minimum locking value, so that the locking differential always generates a certain locking action.

Preferably, however, the basic locking value is lower than 10% and is preferably in the region of 0%, since efficiency can thereby be optimized.

According to a further preferred embodiment, the driven axle has a twin clutch with two individual clutches, the input members of which receive the drive torque and the output members of which are connected in each case to a wheel of the driven axle, the drive torque being distributed by the activation of the twin clutch.

A twin clutch of this type replaces a conventional differential. By the individual clutches being opened or closed (or by the slipping activation of the individual clutches), the drive torque can be distributed largely independently to the two driven wheels. If both individual clutches are closed, then, so to say, a hundred percent transverse lock is implemented.

According to a further alternative embodiment, the driven axle has a transverse differential and clutch-controlled rotational speed influencing means in order to influence the relative rotational speeds of the driven wheels, the drive torque being distributed by the activation of the rotational speed influencing means.

Such a driven axle with clutch-controlled rotational speed influencing means is known, for example, from U.S. Pat. No. 6,120,407.

In the case of a driven axle of this type, for example, a differential cage of a transverse differential can be connected by clutch control to the two drive shafts via respective wheel sets. This takes place alternately and makes it possible, by means of suitable ratios between the wheel sets, to set up a rotational speed difference between the driven wheels. Particularly in cornering, this may be used for increasing the drive dynamics.

Consequently, in this type of driven axle, too, drive torque can be distributed to the driven wheels.

In the two last-mentioned embodiments, it is possible, just as in the activation of a variable locking differential, to distribute the drive torque as a function of a difference between the inner drive slip and the bend slip (for example, multiplied by a scaling factor).

Overall, therefore, a markedly improved response behavior can be achieved, since the calculation of the distribution of the drive torque also incorporates the rotational speed of at least one nondriven wheel. The bend slip is preferably calculated on the basis of the slip between the bend-inside and the bend-outside wheel of a nondriven axle of the motor vehicle.

This rules out the possibility that the result of the bend slip calculation is falsified because of drive slip.

It is particularly advantageous, in this case, if the bend slip is calculated in that the slip between the bend-inside and the bend-outside wheel of the nondriven axle of the motor vehicle is converted via a first characteristic curve (as a rule, vehicle-specific) into the bend slip between the bend-inside and the bend-outside wheel of the driven axle of the motor vehicle.

By virtue of this measure, it is comparatively simple to calculate the bend slip of the driven axle and to put it in relation to the drive slip.

According to a further preferred embodiment, correspondingly, the inner drive slip is calculated in that the rotational speed of the nondriven bend-inside wheel is converted via a second characteristic curve (as a rule, vehicle-specific) into a desired rotational speed of the driven bend-inside wheel, with which desired rotational speed the actual rotational speed of the driven bend-inside wheel is compared.

It is particularly advantageous if the first and/or the second characteristic curve are/is dependent on the angle of a steering wheel of the motor vehicle.

By virtue of this measure, the bend slip or the inner drive slip can in each case be calculated very exactly, since the respective bend radius can be incorporated into the calculation.

Alternatively or additionally to this, it is also possible to calculate the bend slip and/or the inner drive slip as a function of the actual steer angle, that is to say the angle of the vehicle wheels (which, as a rule, is directly proportional to the steering wheel angle).

Furthermore, it is advantageous if the outer drive slip between the bend-outside driven wheel and the bend-outside nondriven wheel is calculated, and if the drive torque is distributed such that the outer drive slip does not overshoot a settable maximum slip. By virtue of this measure, driving stability in the bend limit range can be improved.

In particular, the situation can thus be prevented where the adhesion potential on the bend-outside driven wheel is overshot. This is because the bend-outside driven wheel could then no longer ensure sufficient lateral guidance, and the vehicle would become unstable.

According to a preferred embodiment, the drive torque is distributed by the activation of a variable locking differential of the driven axle, the locking differential being activated such that the locking value is reduced when the outer drive slip overshoots a settable maximum slip.

In general, however, it is also conceivable in this case to distribute the drive torque by means of a twin clutch or by means of rotational speed influencing means, as referred to in the abovementioned alternative embodiments.

The idea of calculating the outer drive slip and of activating an existing variable locking differential such that the locking value is reduced when the drive slip overshoots a settable maximum slip is considered to be an invention on its own.

Preferably, the monitoring of the settable maximum slip is prioritized with respect to a drive torque distribution for the purpose of suppressing the understeering (for example, the actuation of the locking differential in the case of a given locking condition).

In the simplest instance, for example, the locking value is set at the minimum locking value when the settable maximum slip is overshot.

Alternatively, however, it is also possible for the locking differential to be activated such that the degree of locking is the lower, the higher the outer drive slip is when the outer drive slip overshoots the maximum slip.

The settable maximum slip may be dependent, in particular, on the speed of the motor vehicle.

However, the settable maximum slip may be additionally dependent on a series of further parameters, such as, for example, the steer angle, the transverse acceleration, the yawing speed, the engine torque and/or the throttle valve position.

Furthermore, it is possible to relinquish the cancellation or reduction of the degree of locking when the transverse acceleration is very low. This is because, even in travel in a straight line, an outer drive slip can be measured, for example on roads with a generally low coefficient of static friction or in the case of a different coefficient of static friction on the left and on the right side of the vehicle ("µ-split"). In such instances, of course, the locking action is to be maintained in order to ensure the propulsion of the vehicle.

The transverse acceleration can either be measured or be calculated, for example by means of the formula: transverse acceleration=$v^2/r$, where v=vehicle speed and r=bend radius.

Furthermore, overall, it is preferred if the outer drive slip is calculated in that the rotational speed of the nondriven bend-outside wheel is converted via a third characteristic curve (as a rule, vehicle-specific) into a desired rotational speed of the driven bend-outside wheel, with which desired rotational speed the actual rotational speed of the driven bend-outside wheel is compared.

In this case, in particular, it is advantageous if the third characteristic curve is dependent on the angle of the steering wheel of the motor vehicle and/or on the steer angle actually present.

Although it was described initially that the bend slip can be calculated, for example, on the basis of the slip between the bend-inside and the bend-outside wheel of a nondriven axle of the motor vehicle, it is also possible to calculate the bend slip by means of the steer angle. In this case, as a rule, the bend slip is proportional to the steer angle and can be calculated vehicle-specifically.

Alternatively, however, it is also possible to calculate the steer angle of the motor vehicle on the basis of the bend slip between a bend-inside wheel and a bend-outside wheel.

The bend slip may thereby also be used for calculating the steer angle, for example in the event that a steering angle sensor fails or no sensor is used.

It is appreciated that the features mentioned above and those yet to be explained below can be used not only in the combination specified in each case, but also in other combinations or alone, without departing from the scope of the present invention.

BRIEF DESCRIPTION OF THE SEVERAL VIEWS OF THE DRAWING

Exemplary embodiments of the invention are illustrated in the drawing and are explained in more detail in the following description. In the drawing:

FIG. 1 shows a diagrammatic illustration of a motor vehicle with front wheel drive and with an active locking differential on the front axle, said locking differential being activatable according to the invention;

FIG. 2 shows a diagrammatic illustration of a motor vehicle with rear wheel drive, an active locking differential which can be activated according to the invention being provided on the rear axle;

DETAILED DESCRIPTION OF THE INVENTION

Figure 3:
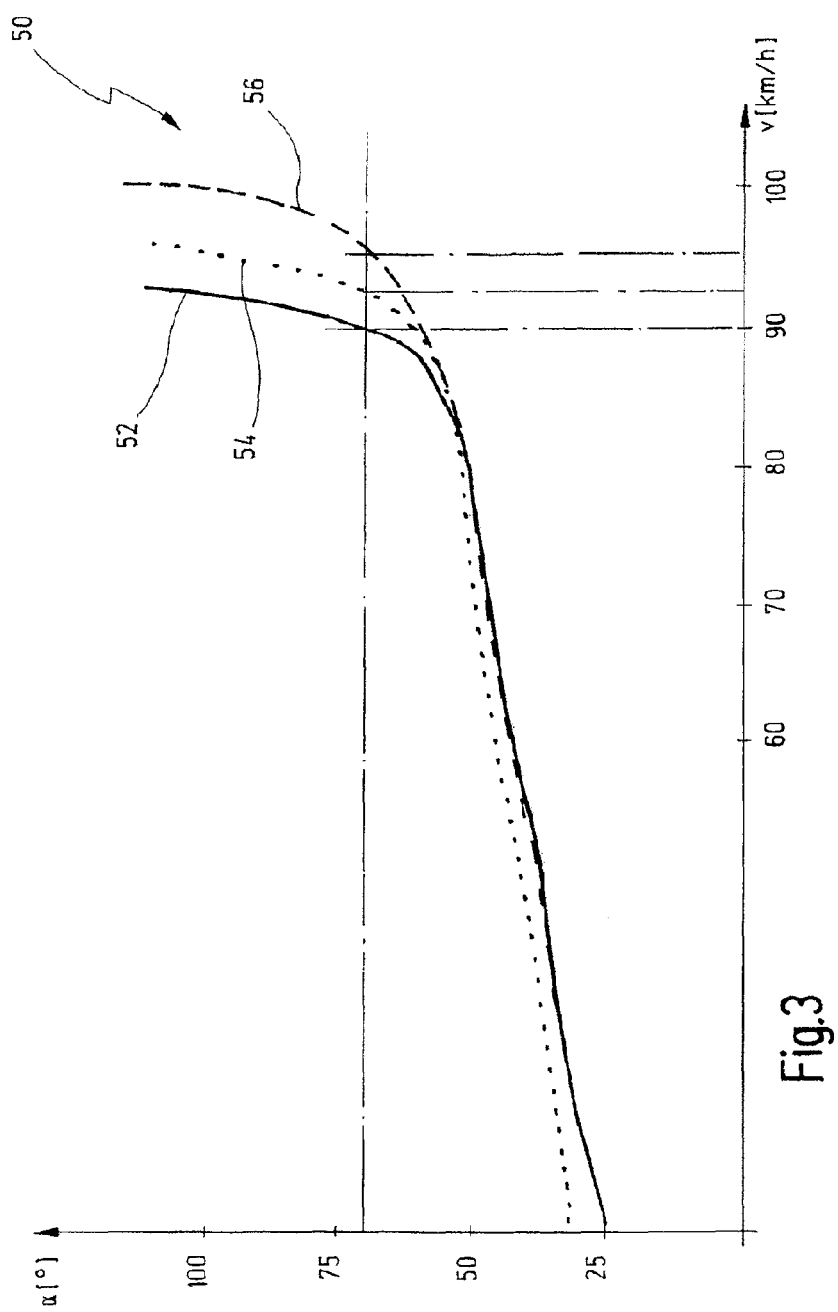
FIG. 3 shows a graph with a comparative illustration of steering angles against the vehicle speed in a vehicle with an open differential on the driven axle, with a passive locking differential on the driven axle and with an active locking differential which is activated according to the invention.

In FIG. 1, a motor vehicle illustrated diagrammatically is designated in general by 10.

The motor vehicle 10 is a vehicle with single-axle drive, having a driven front axle 12 and a nondriven rear axle 14.

The front wheels are designated by VL and VR and the rear wheels by HL and HR.

In the region of the front axle 12, the motor vehicle 10 has a transversely installed engine 16 (internal combustion engine), the output of which is connected to a transmission 18.

The transmission 18 is connected via a final drive wheel set 20 to an input member of a transverse differential 22. A first output member of the transverse differential 22 is connected to a left driveshaft 24 which is connected to the left front wheel VL. A second output member of the transverse differential 22 is connected to a right driveshaft 26 which is coupled to the right front wheel VR.

The transverse differential 22 is part of a locking differential arrangement 28 which contains a locking clutch 30, illustrated diagrammatically, a control device 32 and an actuator 34.

A first member of the locking clutch 30 is connected via a hollow-shaft portion to the input member of the transverse differential 22. A second member of the locking clutch 30 is connected to one of the driveshafts (in the present case, the right driveshaft 26).

The locking clutch 30 either can be opened completely by means of the actuator 34, so that the locking differential arrangement 28 has a locking value (degree of locking) of 0%.

Furthermore, the locking clutch 30 can be activated by means of the actuator 34 such that the input member of the transverse differential 22 and the right driveshaft 26 are connected to one another nonpositively, thus setting up a locking value of 100% (the front wheels VL, VR are then coupled virtually rigidly to one another).

By the actuator 34 of the locking clutch 30 being activated, drive torque can consequently be distributed to the driven wheels VL, VR.

Furthermore, by means of the actuator 34, activated by the control device 32, any desired slip state of the locking clutch 30 can be set up, so that the locking value can generally be regulated freely between 0% and 100%.

The locking clutch 30 may be, for example, a dry friction clutch, a wet friction clutch and, in particular, a dry-running or wet-running multiple-disk clutch.

The actuator 34 may be a hydraulic actuator, but is preferably an electromechanical or electromagnetic actuator.

The control device 32 serves for activating the locking differential arrangement 28 and, furthermore, is coupled to a multiplicity of sensors and to an overriding control device of the motor vehicle 10.

As a function of the various parameters detected or calculated, the control device 32 calculates an optimal locking value of the locking differential arrangement 28 for the respective driving situation, in order thereby to make available, overall, an optimized driving behavior.

Furthermore, FIG. 1 shows at 36 a steering wheel which acts on the front wheels VL, VR via a steering mechanism, not illustrated in any more detail. In particular, by means of the steering wheel 36, a steer angle $\alpha$, which is likewise illustrated in FIG. 1, can be set.

FIG. 2 shows an alternative embodiment of a motor vehicle 10'. The motor vehicle 10' corresponds in construction and functioning generally to the motor vehicle 10 of FIG. 1. Identical elements are therefore indicated by the same reference numerals. Only the differences are explained below.

Thus, the motor vehicle 10' is a vehicle with rear-wheel drive, in which an output of the transmission 18 is connected via an angular gear 40 (in the case of a transverse installation of the engine) and a cardan shaft 42 to a locking differential arrangement 28' in the region of the rear axle 14'.

The functioning of the locking differential arrangement 28' in the region of the rear axle 14' is identical to the functioning of the locking differential arrangement 28 on the front axle 12 of the motor vehicle 10 of FIG. 1.

In the case of motor vehicles with single-axle drive, such as the motor vehicles 10, 10' of FIGS. 1 and 2, the nondriven axle delivers speed information via wheel rotational speed sensors. The speed information may be utilized in order to determine the following parameters:

the desired rotational speed of the driven wheels on the inside of a bend (corner) and on the outside of a bend (corner), specifically without drive slip;

the bend slip occurring on the driven and on the nondriven axle due to cornering; and the detection of cornering as such (specifically also, if appropriate, in which direction).

Furthermore, it is possible to determine the signed variables of steer angle, transverse acceleration and yawing angle speed.

A characteristic value which corresponds to the rotational speed difference of the driven wheels in cornering is designated below as bend slip. The inner drive slip is a characteristic value which corresponds to the rotational speed difference of the bend-inside wheels in cornering, that is to say essentially the slip of the driven bend-inside wheel (as a rule, because, in cornering, the bend-inside wheel is relieved).

The outer drive slip is a characteristic value which corresponds to the rotational speed difference of the bend-outside wheels in cornering, that is to say essentially the slip of the driven bend-outside wheel (if the outer drive slip becomes too high, for example because of too high a transverse acceleration, the maximum lateral guidance force of the wheel is overshot, that is to say the vehicle becomes unstable and consequently may swerve outward).

The locking value or degree of locking is a value in the range of 0% to 100% and is calculated, as a rule, according to the formula ABS (ML−MR)/MGES, ML being the torque transmitted by the left driven wheel, MR being the torque transmitted by the right driven wheel and MGES being the overall available drive torque.

What is considered as slip between two wheels is, in general, the rotational speed difference between these wheels.

The present invention is distinguished in that the locking clutch 30 is activated to a locking value higher than 0% (or higher than a predetermined limit locking value) when the inner drive slip is higher than or equal to the bend slip.

An intensification of understeering in the case of low transverse accelerations can thereby be prevented.

Secondly, the locking clutch 30 is preferably activated such that the locking value is reduced (preferably set at 0%) when the outer drive slip overshoots a settable maximum slip. The maximum slip is selected (and is dependent, if appropriate, on current vehicle parameters) such as to ensure that the lateral guidance forces do not break away on the bend-outside driven wheel.

FIG. 3 shows the driving behavior in the case of constant cornering for a vehicle which is equipped with a variable locking differential which is activated according to the invention, specifically in comparison with a vehicle, of which the transverse differential on the driven axle is open, and with a vehicle, of which the transverse differential on the driven axle is a passive locking differential.

The graph 50 shown in FIG. 3 in this case illustrates the steer angle against the vehicle speed.

The characteristic of the vehicle with an open differential is shown at 52, the characteristic of the motor vehicle with a passive locking differential is shown at 54 and the characteristic according to the invention is shown at 56.

It can be seen that, for example in the case of a steering angle of 70°, bend speeds (cornering speeds) in the region of approximately 90 or 92 km/h can be achieved by means of the known differentials. With the locking differential activated according to the invention, a bend speed of approximately 95 km/h can be implemented.

Figure 4:
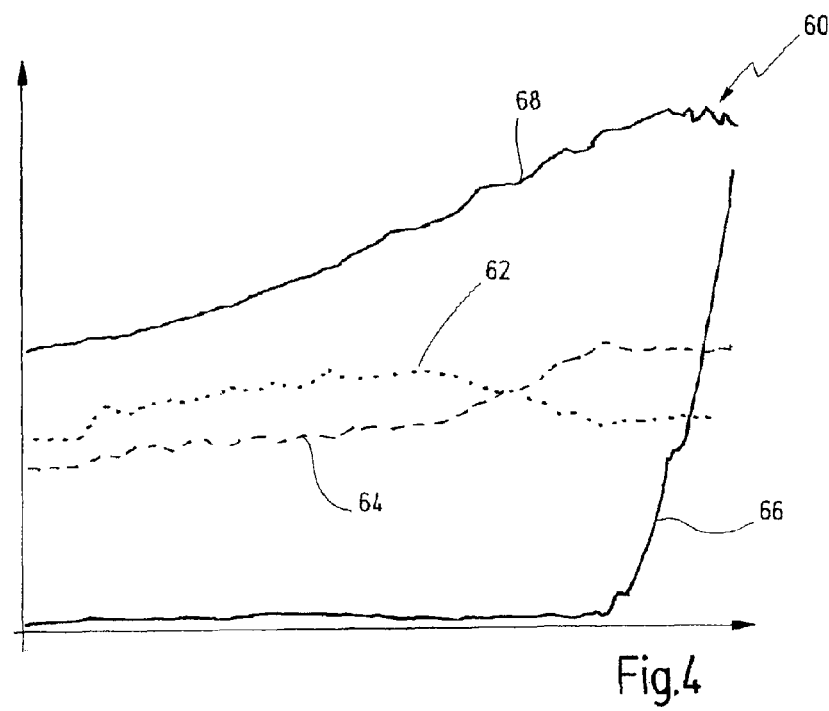
FIG. 4 shows a graph of the steering or driving behavior of a motor vehicle which is equipped with a passive locking differential according to the prior art on the driven axle.

FIG. 4 shows the driving behavior of a vehicle of the prior art which is equipped with a passive locking differential in the driven axle.

The graph 60 of FIG. 4 plots, in this case against time, the torque transmitted by the bend-inside wheel (curve 62), the torque transmitted by the bend-outside wheel (curve 64), the rotational speed difference of the driven wheels (curve 66) and the transverse acceleration achieved (curve 68).

Figure 5:
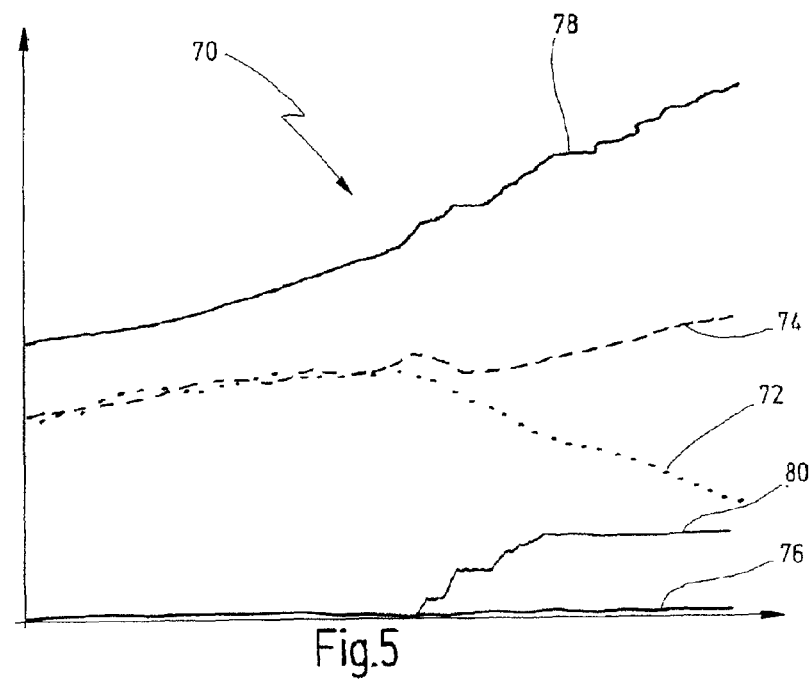
FIG. 5 shows a graph of the steering or driving behavior of a motor vehicle, on the driven axle of which is provided a locking differential which is activated according to the invention.

In comparison with this, FIG. 5 shows the corresponding characteristic values in a graph 70 for a vehicle equipped with an active locking differential which is activated according to the invention.

In FIG. 5, 72 designates the torque transmitted by the bend-inside wheel, the curve 74 designates the torque transmitted by the bend-outside wheel, the curve 76 designates the rotational speed difference of the driven wheels and the curve 78 designates the transverse acceleration.

Furthermore, the activity of the locking differential is shown in FIG. 5 at 80. It can be seen that, with an increasing transverse acceleration, the locking value rises ever further up to a maximum value, in such a way that the rotational speed difference between the driven wheels, that is to say the bend slip, is essentially regulated to 0%.

It can be seen that, in the case of low transverse accelerations, the torques of the bend-inside wheel and the bend-outside wheel are identical, no locking action being achieved.

In contrast to this, it can be seen in FIG. 4 that the torques of the bend-inside wheel and the bend-outside wheel fall apart. More precisely, the torque on the bend-inside wheel is higher, so that an intensification of understeering occurs. This can be avoided according to the invention.

By contrast, according to the invention, in the case of higher transverse accelerations, an even greater reduction in the understeering tendency occurs.

In other words, with an increasing locking value on the bend-outside wheel, a markedly higher torque can be transmitted than on the bend-inside wheel.

Figure 6:
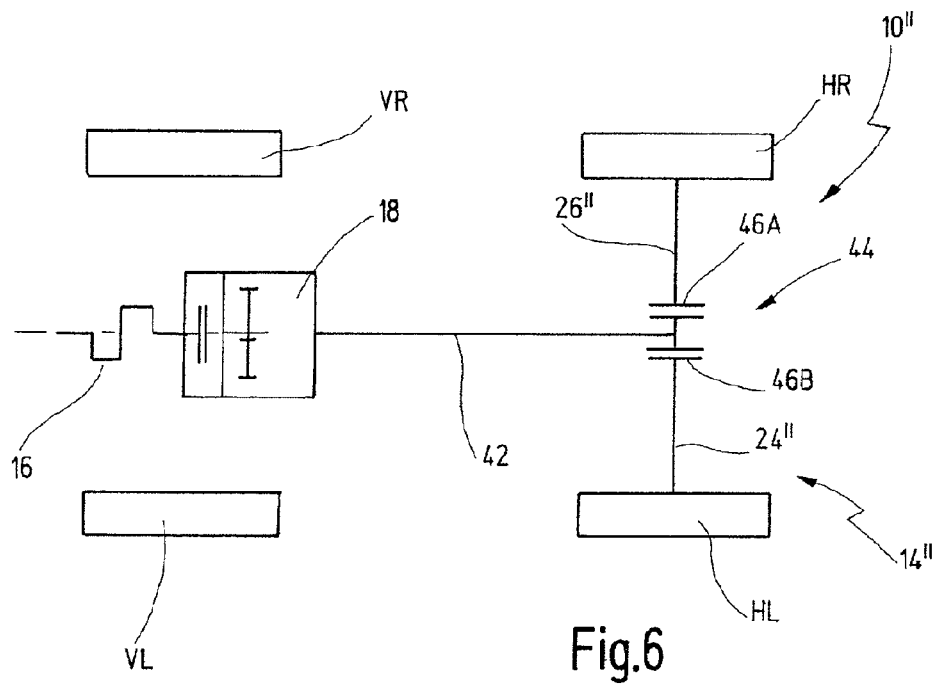
FIG. 6 shows a diagrammatic illustration of an alternative motor vehicle which can be activated according to the invention.

FIG. 6 shows diagrammatically an alternative form of a motor vehicle 10". The motor vehicle 10" has an engine 16 and a transmission 18 with an interposed starting and isolating clutch. An output of the transmission is connected to the driven axle 14" via a cardan shaft 42.

A twin clutch 44 is provided for distributing the drive torque to the driven wheels HR, HL. The twin clutch 44 has two individual clutches 46A, 46B. Their input members are connected to the cardan shaft 42. The output members of the individual clutches 46A, 46B are connected to the drive shafts 24" and 26". By the individual clutches 46A, 46B being activated independently of one another, the torque can be distributed according to the invention to the driven wheels HL, HR.

Figure 7:
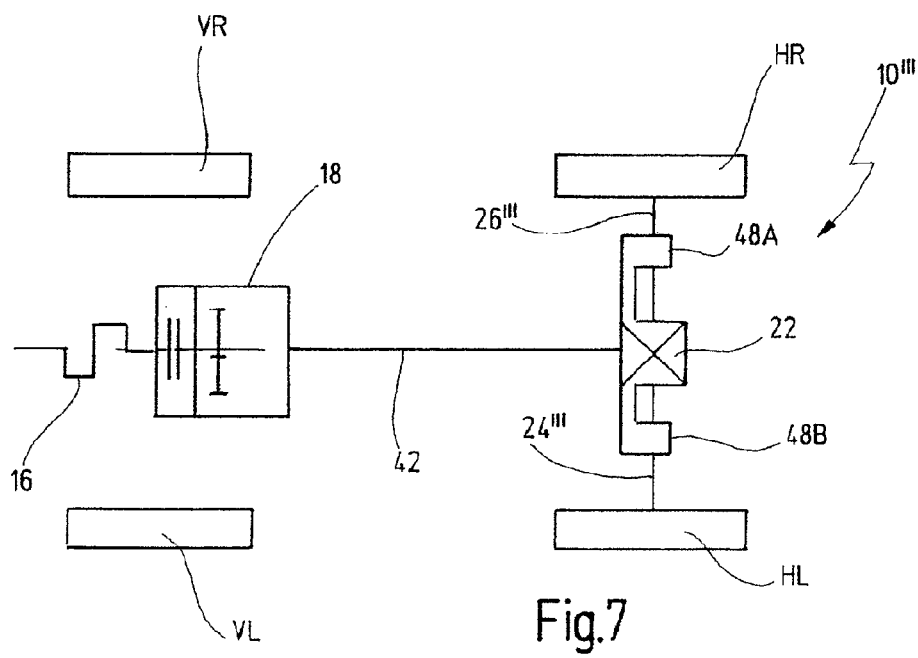
FIG. 7 shows a diagrammatic illustration of a further alternative motor vehicle which can be activated according to the invention.

FIG. 7 shows a further alternative embodiment of a drive train 10'''. The drive train 10''' has exactly the same construction as the drive train 10" of FIG. 6, but rotational speed influencing means 48A, 48B are provided in the region of the driven axle. These rotational speed influencing means may be constructed similarly or identically to what is shown in U.S. Pat. No. 6,120,407. In general, an open transverse differential 22 is provided between the driven wheels HL, HR. A differential cage of the transverse differential 22 is connected to the respective output shaft in each case via an arrangement consisting of a friction clutch and of a wheel set arrangement. By the friction clutches being opened and closed, a rotational speed difference can then be set up between the drive shafts 24''', 26'''. Consequently, by the friction clutches of the rotational speed influencing means 48A, 48B being controlled, the torque can be distributed to the driven wheels HL, HR.

Figure 8:
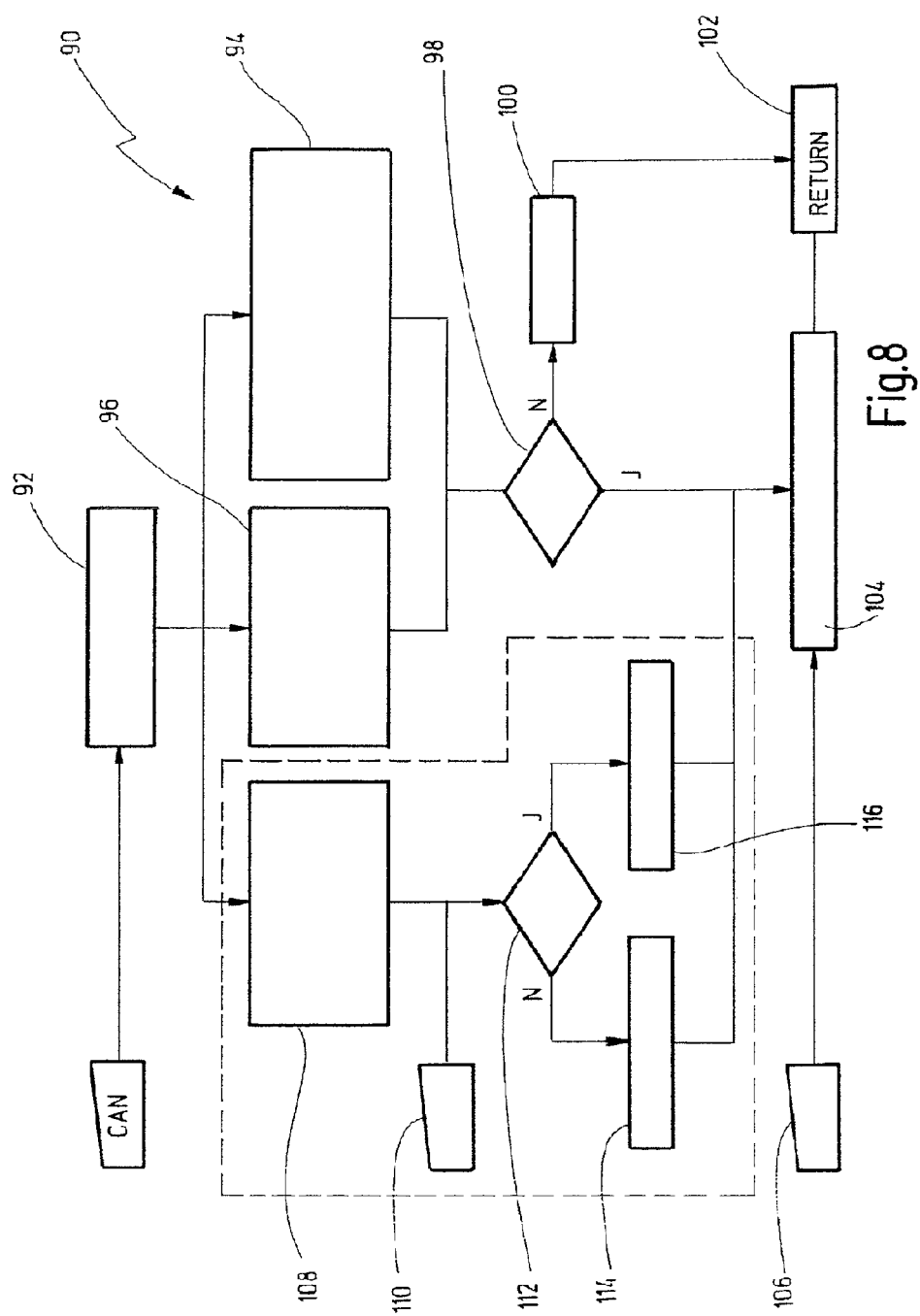
FIG. 8 shows a flow chart which illustrates the method according to the invention.

In FIG. 8, an embodiment of a method according to the invention for activating a locking differential is designated in diagrammatic form at 90. Correspondingly, the embodiment illustrated can also be used for activating a driven axle with a twin clutch 44 or with rotational speed influencing means 48.

The method 90 is implemented in the motor vehicle in a control device in the form of software (although it can also be implemented in hardware) and is repeatedly executed anew in the form of a loop.

At the start of the method, a detection of the wheel rotational speeds takes place in a block 92, the required vehicle parameters being supplied via a CAN bus. In addition to the rotational speeds of the wheels of motor vehicle, steering wheel angles, transverse acceleration and yawing rate can also be read in or calculated in block 92.

In a block 94, first, a calculation of the bend slip is carried out. In parallel with this or immediately thereafter (independently), a calculation of the inner drive slip is carried out (block 96).

The bend slip and the inner drive slip are compared with one another in block 98.

Insofar as the inner drive slip is not higher than the bend slip (N in block 98), the locking value is set at the minimum locking value (block 100), and the loop ends at 102.

If, by contrast, the inner drive slip is higher than or equal to the bend slip, the locking value is set as a function of the determined slip difference in block 104. It would be appreciated that, in this case, various scaling values may also be involved in setting the sensitivity of the controller and/or setting the amplification factor for calculating the desired locking value.

For example, the bend slip may be subjected to a scaling factor in the range of 0.5 to 1.5 before the comparison in block 98, in order thereby to set different driving characteristics. In the simplest instance, such a scaling factor is set at the value 1.

Furthermore, the desired locking value determined in block 104 is multiplied by a scaling value which is determined as follows.

The outer drive slip is calculated in a block 108 from the determination of the various vehicle parameters, including the wheel rotational speeds, in block 92.

The outer drive slip is compared in a block 112 with a maximum slip which is provided from a block 110. The maximum slip may in this case be dependent, in particular, on the vehicle speed, if appropriate also on further parameters, such as transverse acceleration, yawing rate, etc.

Insofar as the outer drive slip is not higher than the maximum slip (N in block 112), the scaling value is set at 1 in block 114. That is to say, the desired locking value determined in block 104 is multiplied by 1, that is to say remains unchanged.

If, by contrast, the outer drive slip is higher than the maximum slip (J in step 112), the scaling value is set at 0 in step 116.

Consequently, in step 104, the desired locking value is multiplied by 0, so that the minimum locking value is set.

What is thus achieved, overall, is that, in general, in steps 94 to 104, the locking differential is activated such that the transverse acceleration is increased markedly, that is to say an understeering tendency is very markedly reduced.

Insofar as this leads, however, to the limit of the maximum lateral guidance force being reached on the bend-outside driven wheel, the locking action is canceled, thus resulting once again in an understecring tendency by virtue of which the vehicle is then stabilized.

After step 104, the method 90 goes to step 102, from which the method is run through anew.

It is appreciated that the activation method according to the invention can be used for active locking differentials, particularly in motor vehicles in which only one axle is driven.

In general, however, it is also possible to use the method according to the invention in the case of vehicles having more than one driven axle.

Furthermore, the method according to the invention can be used, in particular, when the motor vehicle is steered on only one axle (the front axle), that is to say has no all-wheel steering.

Moreover, the steer angle or the bend radius of the vehicle can be deduced from the bend slip determined in block 94. The bend slip thus determined can thereby be used to provide steer angle information for other vehicle systems. This may be expedient particularly when a corresponding sensor signal is absent or is faulty (as a rule, vehicles without ESP possess no steering angle sensor and no information on transverse acceleration).

However, transverse acceleration can also be calculated via the bend slip and the vehicle speed since the bend slip corresponds, of course, to the negotiated bend radius.

What is claimed is:

1. A method for the distribution of drive torque to driven wheels of a driven axle of a motor vehicle during cornering through a bend, wherein the motor vehicle has a bend-inside driven wheel, a bend-outside driven wheel, a bend-inside non-driven wheel, and a bend outside non-driven wheel, the method, performed by a controller, having the steps,
    calculating a bend slip between the bend-inside driven wheel and the bend-outside driven wheel of the driven axle of the motor vehicle, wherein the bend slip corresponds to the difference of the speed of the bend-inside driven wheel and the speed of the bend- outside driven wheel,
    calculating an inner drive slip between the bend-inside driven wheel and the bend- inside non-driven wheel, wherein the inner drive slip corresponds to the difference of the speed of the bend-inside driven wheel and the speed of the bend-inside non-driven wheel,
    distributing the drive torque between the bend-inside driven wheel and the bend-outside driven wheel as a function of a difference between the inner drive slip and the bend slip, multiplied by a scaling factor, wherein the scaling factor is a variable scaling factor, and
    adjusting a desired driving mode by adjusting the scaling factor.

2. The method as claimed in claim 1, more drive torque being allocated to the bend outside driven wheel when the inner drive slip is higher than or equal to the bend slip, multiplied by a scaling factor.

3. The method as claimed in claim 1, the drive torque being distributed by the activation of a variable locking differential of the driven axle.

4. The method as claimed in claim 3, the locking differential being activated in response to a locking value of more than a predetermined basic locking value solely in the case of the locking condition that the inner drive slip is higher than or equal to the bend slip, multiplied by a scaling factor.

5. The method as claimed in claim 4, in the case of the locking condition the locking differential being activated such that the locking value is higher, the higher the inner drive slip is.

6. The method as claimed in claim 4, the basic locking value being a minimal locking value of the locking differential.

7. The method as claimed in claim 4, the basic locking value being lower than 10%.

8. The method as claimed in claim 1, the driven axle having a twin clutch with two individual clutches, the input members of which receive the drive torque and the output members of which are connected in each case to a wheel of the driven axle, and the drive torque being distributed by the activation of the twin clutch.

9. The method as claimed in claim 1, the driven axle having a transverse differential and clutch controlled rotational speed influencing means, in order to influence the relative rotational speeds of the driven wheels, and the drive torque being distributed by the activation of the rotational speed influencing means.

10. The method as claimed in claim 1, the bend slip being calculated on the basis of the slip between the bend inside non-driven wheel and the bend outside non-driven wheel of a nondriven axle of the motor vehicle.

11. The method as claimed in claim 10, the bend slip being calculated by converting the slip between the bend inside non-driven wheel and the bend outside non-driven wheel using a first vehicle-specific characteristic curve into a vehicle-specific bend slip between the bend inside driven wheel and the bend outside driven wheel.

12. The method as claimed in claim 11, the inner drive slip being calculated by converting the rotational speed of the nondriven bend inside wheel using a second vehicle-specific characteristic curve into a desired rotational speed of the driven bend inside wheel, wherein the actual rotational speed of the driven bend inside wheel is compared with the desired rotational speed of the driven bend-inside wheel.

13. The method as claimed in claim 12, at least one of the first and the second vehicle-specific characteristic curves being dependent on the angle of a steering wheel of the motor vehicle.

14. The method as claimed in claim 1, an outer drive slip between the bend outside driven wheel and the bend outside non-driven wheel being calculated, and the drive torque being distributed such that the outer drive slip does not overshoot a settable maximum slip.

15. The method as claimed in claim 14, the drive torque being distributed by the activation of a variable locking differential of the driven axle, and the locking differential being activated such that the locking value is reduced when the outer drive slip overshoots a settable maximum slip.

16. The method as claimed in claim 15, the locking differential being activated such that the degree of locking is the lower, the higher the drive slip is when the outer drive slip overshoots the maximum slip.

17. The method as claimed in claim 14, the settable maximum slip being a value dependent on the speed of the motor vehicle.

18. The method as claimed in claim 14, the outer drive slip being calculated by converting the rotational speed of the nondriven bend outside wheel using a third vehicle-specific characteristic curve into a desired rotational speed of the driven bend-outside wheel, wherein the actual rotational speed of the driven bend-outside wheel is compared with the desired rotational speed of the driven bend-outside wheel.

19. The method as claimed in claim 18, the third vehicle-specific characteristic curve being dependent on the angle of a steering wheel of the motor vehicle.

20. The method as claimed in claim 1, the steer angle of the motor vehicle being calculated on the basis of the bend slip between a bend inside wheel and a bend outside wheel.

* * * * *